United States Patent [19]

Nakamura et al.

[11] Patent Number: 4,649,001
[45] Date of Patent: Mar. 10, 1987

[54] PROCESS FOR PRODUCING POLYETHYLENE EXTRUDED FOAMS

[75] Inventors: Hisao Nakamura, Utsunomiya; Shoji Iwano, Nishikata, both of Japan

[73] Assignee: Japan Styrene Paper Corporation, Tokyo, Japan

[21] Appl. No.: 723,835

[22] Filed: Apr. 16, 1985

[30] Foreign Application Priority Data

Apr. 17, 1984 [JP]  Japan .................. 59-77184
Apr. 20, 1984 [JP]  Japan .................. 59-79878

[51] Int. Cl.$^4$ .................. B29C 67/22; C08J 9/04; C08L 23/20
[52] U.S. Cl. .................. 264/50; 264/53; 264/54; 264/DIG. 5; 264/DIG. 13; 521/134; 525/240
[58] Field of Search .............. 264/50, 53, 54, DIG. 5, 264/DIG. 13

[56] References Cited

U.S. PATENT DOCUMENTS

| | | | |
|---|---|---|---|
| 4,078,020 | 3/1978 | Rose et al. .................. | 525/240 |
| 4,181,647 | 1/1980 | Beach .................. | 264/50 X |
| 4,205,021 | 5/1980 | Morita et al. .................. | 525/240 |
| 4,255,368 | 3/1981 | Olabisi .................. | 264/50 X |
| 4,330,639 | 5/1982 | Matsuura et al. .................. | 525/240 |
| 4,454,087 | 6/1984 | Hayashi et al. .................. | 264/50 X |
| 4,495,334 | 1/1985 | Matsuura et al. .................. | 525/240 |
| 4,510,031 | 4/1985 | Matsumura et al. .................. | 525/240 X |
| 4,536,549 | 8/1985 | Hattori et al. .................. | 525/240 |
| 4,542,188 | 9/1985 | van der Heijden .................. | 525/240 |
| 4,563,504 | 1/1986 | Hert et al. .................. | 525/240 |

Primary Examiner—Philip Anderson
Attorney, Agent, or Firm—Sherman & Shalloway

[57] ABSTRACT

In a process for producing a polyethylene extruded foam, which comprises melting and kneading a composition of a polyethylene-based resin containing a foaming agent and extrusion-foaming it, a linear low-density polyethylene having a broadness of molecular weight distribution is used as the polyethylene-based resin. The linear low-density polyethylene used has a density of 0.920 to 0.940 g/cm$^3$, a melt flow rate of 0.3 to 10 g/10 min's and a relationship $Mw/Mw \geq 4$ between a weight average molecular weight and a number average molecular weight.

9 Claims, No Drawings

PROCESS FOR PRODUCING POLYETHYLENE EXTRUDED FOAMS

BACKGROUND OF THE INVENTION (1) Field of the Invention

The present invention relates to a process for producing polyethylene extruded foams.

(2) Description of the Prior Art

Polyethylene extruded foams have been widely used in various applications as a buffer, a heat-insulating material, packaging material, a building material, etc. Particularly, thin sheet-like extruded foams of this type are made by extruding a starting material with the clearance of a die lip being narrowed, and drawing the foam sheet at a drawing rate increased relative to a extrusion rate into a thin shape. Foams made by the extrusion foaming of low density polyethylenes (having a long chain-branched skeleton, which will be referred to as a LDPE hereinbelow), which have been widely used in recent years for reasons of an excellent foaming formability and softness, however, are accompanied by disadvantages. Because they have a small elongation and an inferior tensile strength, they are apt to break when being drawn into a thin shape. Therefore, it is difficult to produce a long and thin sheet-like extruded foam.

SUMMARY OF THE INVENTION

The present inventors have extensively studied to overcome the above disadvantages in the prior art. As a result, it has been found that the extrusion foaming of a linear low-density polyethylene enables particularly a long and thin sheet-like extruded foam to be easily produced which has the advantages of the conventional LDPE extruded foams and an elongation, tensile strength and durability improved over those of the conventional LDPE extruded foams, and thus, the present invention has been accomplished.

It is therefore an object of the present invention to provide a process for producing polyethylene foams which comprises melting and kneading, with a foaming agent, a linear low-density polyethylene having a density of 0.920 to 0.940 g/cm$^3$, a melt flow rate of 0.3 to 10 g/10 minutes and a relationship of Mw/Mn≧4 between a weight average molecular weight Mw and a number average molecular weight Mn, and extruding and foaming it.

According to the present invention, it is possible to easily produce a polyethylene extruded foam having an elongation, tensile strength and durability improved over those of the conventional LDPE extruded foams, while maintaining the advantages of the latter, and particularly, it is possible to easily produce a long and thin sheet-like polyethylene extruded foam which is not apt to break even when it is drawn at a drawing rate increased relative to an extrusion rate in the production thereof.

When use is made of a polyethylene mixture obtained by mixing LDPE with LLDPE, proper extrusion foaming temperatures are extended over a wide range and extremely easy to control during the extrusion foaming, thus making it possible to produce an extruded foam having a high foaming ratio.

DETAILED DESCRIPTION OF THE INVENTION AND PREFERRED EMBODIMENT

Linear low-density polyethylenes (which will be referred to as an LLDPE hereinafter) used in the present invention are copolymers (containing about 0.5 to 10 mol % of an α-olefin) of ethylene and α-olefins having 3 to 8 carbon atoms, which are polyethylene copolymers having a linear skeleton and containing short branched chains each having usually 8 or less carbon atoms. Such α-olefins include propylene, butene-1, pentene-1, hexene-1, heptene-1, octene-1, 4-methylpentene-1, etc., and particularly, propylene and butene-1 are preferred. Such LLDPE's used are those having a density of 0.920 to 0.940 g/cm$^3$, a melt flow rate (which will be referred to as MFR hereinbelow) of 0.3 to 10 g/10 minutes and a relationship of Mw/Mn≧4 between a weight average molecular weight Mw and a number average molecular weight Mn. If an LLDPE having a density of less than 0.920 g/cm$^3$ is used, then the resulting extruded foam has an inferior rigidity (nerve). If an LLDPE having a density exceeding 0.940 g/cm$^3$ is used, then the resulting extruded foam has a poor softness, tensile strength and elongation. In addition, with an LLDPE having a MFR of less than 0.3 g/10 minutes, the viscosity thereof during melting is higher, resulting in a difficult extrusion foaming. On the other hand, with an LLDPE having a MFR exceeding 10 g/10 minutes, the viscosity thereof during melting is too decreased, causing the problems that the resultant extruded foam is lowered in foaming ratio and apt to contain continuous cell. When an LLDPE is used having a narrow molecular weight distribution and a relationship of Mw/Mn<4, a range of temperature leading to a viscosity suitable for the extrusion foaming will become narrow, and a slight difference in temperature causes the viscosity to substantially vary during the melting, so that the extrusion foaming formability may be deteriorated. Therefore, a proper extrusion foaming temperature is difficult to control.

In the process according to the present invention, an LLDPE as described above is melted and kneaded with a foaming agent under a pressure in an extruder which is usually employed, and then extruded and foamed into a lower pressure atmosphere out of the extruder. Such foaming agents used in this extrusion foaming include inorganic gases such as carbon dioxide; volatile foaming agents such as propane, butane, pentane, hexane, butadiene, methylene chloride, dichlorodifluoromethane, trichloromonofluoromethane, monochlorotrifluoromethane, etc., and decomposible foaming agents such as azo-dicarboxyamide, dinitroso-pentamethylene tetramine, azo-bis-isobutylonitrile, p,p'-oxybisbenzene sulfonyl hydrazide, sodium hydrogencarbonate, etc., or the like. In the foaming, a small amount of an inorganic powder such as talc, silica, etc., or mixture or reaction product of a polycarboxylic acid with sodium hydrogencarbonate may be used as a cell size regulator for a foam. The amounts of foaming agent and cell size regulator added are usually of 5 to 40 parts and 0.05 to 2.0 parts by weight based on 100 parts by weight of the resin, respectively.

According to the present invention, it is possible to produce a polyethylene extruded foam having a foaming ratio of 5 to 50 times and a thickness of 0.1 to 5 mm, and particularly to easily and satisfactorily produce a long and thin sheet-like polyethylene extruded foam having a thickness of 0.1 to 3 mm.

According to the present invention, a low density polyethylene can be mixed with a linear low-density polyethylene (LLDPE). In this case, the low density polyethylene (LDPE hereinafter) applied in the present invention indicates a low density polyethylene having a long branched chain skeleton, and in general, a low density polyethylene produced in a high pressure process is used. The mixing of such a LDPE causes the range of an appropriate extrusion foaming temperature to be extended and the control in temperature to be further facilitated. Therefore, an extruded foam can be produced at a convenient condition, and it is possible to improve a productivity and at the same time to produce an extruded foam having a foaming ratio higher than that as with an LLDPE alone, which is advantageous.

Such LDPE's are preferably those having a density of 0.918 to 0.923 g/cm$^3$ and a MFR of 0.1 to 10 g/10 minutes. The use of an LDPE having a density of less than 0.918 g/cm$^3$ will not provide an extruded foam having an excellent rigidity (nerve), whilst the use of an LDPE having a density exceeding 0.923 g/cm$^3$ will not give an extruded foam having an excellent elongation and tensile strength. Further, the use of an LDPE having a MFR out of the above-described range makes it difficult to carry out a satisfactory extrusion foaming as in the use of an LLDPE having a MFR out of a range of 0.3 to 10 g/10 minutes.

A mixture to be provided in the extrusion foaming in the present invention, which consists of an LLDPE and an LDPE, have preferably a composition comprising 10 to 40% by weight of LLDPE and 90 to 60% by weight of the LDPE. If the amount of LDPE contained in such polyethylene mixture exceeds 90% by weight, then the elongation and tensile strength of a resulting extruded foam is deteriorated, and a long and thin sheet-like extruded foam is difficult to obtain. Also, the amount of LDPE contained of less than 60% weight results in that it is difficult to extend an appropriate extrusion foaming temperature range and to produce an extruded foam having a higher foaming ratio.

A process for producing an extruded foam using a polyethylene mixture consisting of an LLDPE and an LDPE is conducted as in the above-described process for producing an extruded foam using an LLDPE alone. A similar foaming agent and cell size regulator are also used and the amount thereof are the same as described above: i.e., the amount of foaming agent added is of 5 to 40 parts by weight based on 100 parts by weight of the resin and that of cell size regulator added is of 0.05 to 2.0 parts by weight based on 100 parts by weight of the resin.

Such a process using a polyethylene mixture of an LLDPE and an LDPE enables a polyethylene extruded foam having a foaming ratio of 5 to 50 times and a thickness of 0.2 to 6 mm to be produced, and is particularly benefical in producing a long and thin sheet-like extruded foam having a thickness of 0.2 to 4 mm.

According to the present invention, it is possible to easily producing a polyethylene extruded foam having an elongation, tensile strength and durability improved over those of the conventional LDPE extruded foam while maintaining the advantages of the latter. Particularly, it is possible to easily produce a long and thin sheet-like polyethylene extruded foam which is not in danger to break even when it is drawn at a drawing rate increased relative to an extruding rate in the production thereof.

In addition, the use of a polyethylene mixture obtained from the mixing of an LDPE with an LLDPE presents an advantage that a proper extrusion foaming temperature range is permitted to extend and the control in temperature is extremely facilitated during the extrusion foaming, while the extruded foam can be produced having a higher foaming ratio.

The present invention will now be further described in detail by way of Examples.

EXAMPLES 1 TO 3 AND COMPARATIVE EXAMPLES 1 TO 3

To 100 parts by weight of a linear low-density polyethylene-based resin given in Table 1 are added 20 parts by weight of butane and 1.5 parts by weight of talc, and they are melted and kneaded in an extruder and then extruded and foamed out of the extruder to produce a thin foamed sheet. The extrusion foaming formability in the extrusion foaming and the properties of the resulting foamed sheet are given together in Table 1.

EXAMPLES 4 TO 6 AND COMPARATIVE EXAMPLES 4 TO 6

To 100 parts by weight of polyethylene resin mixture given in Table 2 are added 20 parts by weight of butane and 1.5 parts by weight of talc, and they are melted and kneaded in an extruder, and then extruded and foamed out of the extruder to produce a thin foamed sheet. The extrusion foaming formability in the extrusion foaming and the properties of the resulting foamed sheet are given in Table 3.

TABLE 1

| | Polyethylene resin | | | |
|---|---|---|---|---|
| | type | density (g/cm$^3$) | MFR g/10 min's | Mw/ Mn | Extrusion foaming formability* |
| Example No. | | | | | |
| 1 | LLDPE | 0.920 | 0.80 | 6.9 | good |
| 2 | LLDPE | 0.932 | 4.80 | 4.0 | good |
| 3 | LLDPE | 0.923 | 1.95 | 4.2 | good |
| Comparative Example No. | | | | | |
| 1 | LLDPE | 0.926 | 11.7 | 4.0 | less good |
| 2 | LLDPE | 0.919 | 0.88 | 3.5 | inferior |
| 3 | LDPE | 0.919 | 0.3 | 6.0 | good |

*An extrusion foaming formability determined depending on the difficulty of the control in proper extrusion foaming temperature as follows:
An easy control in proper extrusion foaming temperature — good
A slight difficult control in such temperature — less good
A difficult control in such temperature — inferior

| | Foamed sheet | | | | |
|---|---|---|---|---|---|
| | Foaming ratio (times) | Thickness (mm) | Tensile strength (Kg/cm$^2$)** | Elongation (%)*** | Note |
| Example No. | | | | | |
| 1 | 25 | 0.6 | 16 | 250 | *4 |
| 2 | 20 | 0.6 | 13 | 250 | *4 |
| 3 | 25 | 0.6 | 14 | 250 | *4 |
| Comparative Example No. | | | | | |
| 1 | 10 | 0.6 | 11 | 200 | *5 |
| 2 | — | — | — | — | *6 |
| 3 | 25 | 0.6 | 10 | 70 | *7 |

**A tensile strength determined as a strength in the longitudinal direction of the sheet according to JIS K-6767
***A % elongation determined as a % elongation in the longitudinal direction of the sheet according to JIS K-6767
*4 A long foamed sheet was obtained without breakage.
*5 A long foamed sheet was obtained without breakage, but apt to continuous cell.
*6 A foamed sheet was not obtained.
*7 A long foamed sheet was not obtained due to the furios breakage.

TABLE 2

| | LLDPE in polyethylene resin mixture | | | |
|---|---|---|---|---|
| | Density (g/cm³) | MFR (g/10 min's) | Mw/Mn | Content (% by weight) |
| Example No. | | | | |
| 4 | 0.920 | 0.80 | 6.9 | 15 |
| 5 | 0.932 | 4.80 | 4.0 | 27 |
| 6 | 0.923 | 1.95 | 4.2 | 38 |
| Comparative Example No. | | | | |
| 4 | 0.926 | 11.7 | 4.0 | 15 |
| 5 | 0.919 | 0.88 | 3.5 | 40 |
| 6 | — | — | — | 0 |

| | LDPE in polyethylene resin mixture | | |
|---|---|---|---|
| | Density (g/cm³) | MFR (g/10 min's) | Content (% by weight) |
| Example No. | | | |
| 4 | 0.922 | 0.77 | 85 |
| 5 | 0.918 | 4.50 | 73 |
| 6 | 0.922 | 0.77 | 62 |
| Comparative Example No. | | | |
| 4 | 0.922 | 0.77 | 85 |
| 5 | 0.918 | 4.50 | 60 |
| 6 | 0.922 | 0.77 | 100 |

TABLE 3

| | Extrusion foaming formability | Foamed sheet | | | | |
|---|---|---|---|---|---|---|
| | | Foaming ratio (times) | Thickness (mm) | Tensile strength (Kg/cm²)** | Elongation (%)*** | Note |
| Example No. | | | | | | |
| 4 | good | 45 | 0.7 | 11 | 160 | *4 |
| 5 | good | 40 | 0.7 | 12 | 160 | *4 |
| 6 | good | 35 | 0.7 | 12 | 170 | *4 |
| Comparative Example No. | | | | | | |
| 4 | less good | 30 | 0.6 | 9 | 120 | *5 |
| 5 | inferior | — | — | — | — | *6 |
| 6 | good | 25 | 0.6 | 9 | 70 | *7 |

*, , *, and *4 to *7 as described above.

What is claimed is:

1. A process for producing a polyethylene extruded foam, which comprises melting and kneading with a foaming agent, an ethylene-α-olefin copolymer having a density of 0.920 to 0.940 g/cm³, a melt-flow rate of 0.3 to 10 g/10 minutes and a relationship of Mw/Mn greater than or equal to 4 between a weight average molecular weight Mw and a number average molecular weight Mn, and extruding and foaming it.

2. A process for producing a polyethylene extruded foam according to claim 1, wherein a mixture of said ethylene-α-olefin copolymer with a low-density polyethylene is used.

3. A process for producing a polyethylene extruded foam according to claim 2, wherein the low density polyethylene has a density of 0.918 to 0.923 g/cm³ and a melt flow rate of 0.1 to 1.0 g/10 min's.

4. A process for producing a polyethylene extruded foam according to claim 2, wherein the mixture of polyethylenes consists of 10 to 40% by weight of said ethylene-α-olefin copolymer and 90 to 60% by weight of a low-density polyethylene.

5. A polyethylene composition comprising a mixture of an ethylene-α-olefin copolymer having a density of 0.920 to 0.940 g/cm³, a melt-flow rate of 0.3 to 10 g/10 minutes and a weight average molecular weight Mw and a number average molecular weight Mn relationship of Mw/Mn greater than or equal to 4 and a low-density polyethylene having a density of 0.918 to 0.923 g/cm³ and a melt-flow rate of 0.1 to 1.0 g/10 minutes.

6. A polyethylene composition as in claim 5 comprising 10 to 40% by weight of the ethylene-α-olefin copolymer and 90 to 60% by weight of the low-density polyethylene.

7. A polyethylene composition as in claim 6 having an added blowing agent yielding a foaming ratio of 5 to 50 times, a tensile strength of 11 to 12 Kg/cm², a thickness of 0.2 to 6 mm, and an elongation of up to 170%.

8. A polyethylene composition comprising an ethylene-α-olefin copolymer having a density of 0.920 to 0.940 g/cm³, a melt-flow rate of 0.3 to 10 g/10 minutes and a relationship of Mw/Mn greater than or equal to 4 between a weight average molecular weight Mw and a number average molecular weight Mn.

9. A polyethylene composition as in claim 8 having an added blowing agent yielding a foaming ratio of 5 to 50 times, a tensile strength of 13 to 16 Kg/cm², an elongation of up to 250%, and a thickness of 0.1 to 5 mm.

* * * * *